(12) United States Patent
Herzig et al.

(10) Patent No.: US 6,835,419 B2
(45) Date of Patent: Dec. 28, 2004

(54) AMMONIO-CONTAINING ORGANOSILICON COMPOUNDS

(75) Inventors: Christian Herzig, Waging am See (DE); Robert Banfic, Burgkirchen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/333,937

(22) PCT Filed: Mar. 29, 2001

(86) PCT No.: PCT/EP01/03593
§ 371 (c)(1),
(2), (4) Date: Jul. 30, 2003

(87) PCT Pub. No.: WO02/10255
PCT Pub. Date: Feb. 7, 2002

(65) Prior Publication Data
US 2004/0028827 A1 Feb. 12, 2004

(30) Foreign Application Priority Data
Jul. 27, 2000 (DE) ......................... 100 36 678

(51) Int. Cl.$^7$ ................................. B05D 3/00
(52) U.S. Cl. .................. 427/387; 427/389.7; 427/389.9
(58) Field of Search ............................. 427/387, 389.7, 427/389.9

(56) References Cited

U.S. PATENT DOCUMENTS

| | | | |
|---|---|---|---|
| 4,101,272 A | | 7/1978 | Guise et al. |
| 4,833,225 A | | 5/1989 | Schaefer et al. |
| 4,891,166 A | | 1/1990 | Schaefer et al. |
| 5,707,434 A | * | 1/1998 | Halloran et al. ....... 106/287.11 |
| 5,807,956 A | | 9/1998 | Czech |
| 6,242,554 B1 | | 6/2001 | Busch et al. |

FOREIGN PATENT DOCUMENTS

| | | | |
|---|---|---|---|
| DE | 10036699 | * | 2/2002 |
| EP | 0017121 | | 10/1980 |
| EP | 0017122 | | 10/1980 |
| EP | 0282720 | | 9/1988 |
| EP | 0294642 | | 12/1988 |
| EP | 0837103 | | 4/1998 |
| EP | 0837104 | | 4/1998 |
| EP | 1000959 | | 5/2000 |
| WO | WO 02/10254 | * | 2/2002 |

OTHER PUBLICATIONS

English Derwent Abstract AN 1980–75436C [43] corresp. to EP 0017122 A.
English Derwent Abstract AN 1980–73729C [42] corresp. to EP 0017121.

* cited by examiner

*Primary Examiner*—Erma Cameron
(74) *Attorney, Agent, or Firm*—Brooks Kushman P.C.

(57) ABSTRACT

The invention relates to novel organosilicon compounds comprising ammonium groups, said compounds being soluble in isopropanol or diethylene glycol monobutyl ether, and containing: a) at least one structural unit of general formula (I) wherein $R^2$ represents a bivalent organic radical containing a hydroxyl group which is conditioned by a ring opening of an epoxy group; $R^3$ represents a hydrogen atom or a monovalent hydrocarbon radical comprising 1 to 60 carbon atoms per radical, and can be split or substituted by at least one separate heteroatom chosen from the group consisting of nitrogen, oxygen, sulphur or halogen atoms; $R^4$ represents a bivalent hydrocarbon radical comprising 1 to 10 carbon atoms per radical; n represents 0 or a whole number from 1 to 10; m represents a whole number from 1 to the total number of nitrogen atoms in (I); x represents 0 or 1; and $X^-$ represents an anion, b) at least one siloxane unit of general formula (II), and c) at least two siloxane units of general formula (III) wherein R, $R^1$, a and b have the designation cited in patent claim (1), provided that the siloxane units of formula (III) are connected to the structural unit of formula (I) via the Si atoms via the $R^2$ radicals.

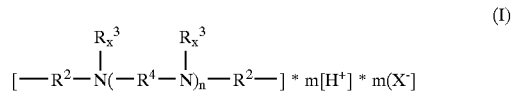
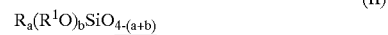
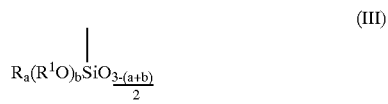

13 Claims, No Drawings

AMMONIO-CONTAINING ORGANOSILICON COMPOUNDS

BACKGROUND OF THE INVENTION

1. Field of the Invention

This invention relates to ammonio-containing organosilicon compounds and their preparation.

2. Description of the Related Art

U.S. Pat. No. 4,101,272 (Commonwealth Scientific and Industrial Research Organization, issued Jul. 18, 1978) describes a process for the treatment of wool that comprises epoxysiloxanes and amines being applied to the wool as separate substances and reacting in situ to form crosslinked insoluble structures.

U.S. Pat. No. 4,833,225 (Goldschmidt, issued May 23, 1989) discloses polyquaternary polysiloxane polymers of the block structure $(AB)_nA$, which are obtained by reaction of $\alpha,\omega$-epoxysiloxanes with ditertiary diamines in the presence of acids. The block copolymers contain quaternary nitrogen atoms.

U.S. Pat. No. 5,807,956 (OSi Specialties, Inc., issued Sep. 15, 1998) describes block copolymers of the structure $(AB)_n A$ which contain polyalkylene oxide chains. They are prepared by reacting $\alpha,\omega$-epoxysiloxanes with $\alpha,\omega$-aminoalkyl polyethers, although the poor mutual solubility of the reactants means that relatively large amounts of organic solvents are needed to achieve adequate compatibility.

SUMMARY OF THE INVENTION

It is an object of the present invention to provide ammonio-containing organosilicon compounds which are uncrosslinked, i.e. soluble, and which are preparable by a simple process without the use of major amounts of organic solvents, which are obtainable with linear, branched or dendrimer-like structures, and whose viscosity can be adjusted over a wide range. These and other objects are achieved by the invention, wherein polyamines as defined hereafter are reacted with epoxy-containing organosilicon compounds to form a toluene-soluble amino-functional intermediate, and protonated to form uncrosslinked, solvent-soluble ammonium group (ammonio)-containing organosilicon compounds.

DETAILED DESCRIPTION OF THE INVENTION

The present invention accordingly provides ammonio-containing organosilicon compounds which are soluble in isopropanol or diethylene glycol monobutyl ether and contain (a) at least one structural unit of the general formula

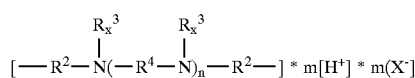

(I)

where $R^2$ is a divalent organic radical which contains a hydroxyl group from a ring-opening of an epoxy group, $R^3$ is a hydrogen atom or a monovalent hydrocarbon radical having 1 to 60 carbon atoms per radical which may be interrupted or substituted by one or more separate heteroatoms selected from the group consisting of nitrogen, oxygen, sulfur and halogen, $R^4$ is a divalent hydrocarbon radical having 1 to 10 carbon atoms per radical, n is 0 or an integer from 1 to 10, m is an integer from 1 to the total number of nitrogen atoms in (I), preferably an integer from 1 to the sum of n+1 and the total number of all the basic nitrogen atoms optionally present in the radicals $R^3$, and each x is the same or different and represents 0 or 1, $X^-$ is an anion, preferably an anion of a corresponding acid, (b) at least one siloxane unit of the general formula

(II)

where each R is the same or different and represents a monovalent optionally halogenated hydrocarbon radical having 1 to 18 carbon atoms per radical, each $R^1$ is the same or different and represents a monovalent hydrocarbon radical having 1 to 8 carbon atoms per radical, a is 0, 1, 2 or 3, b is 0, 1, 2 or 3, with the proviso that the sum of a+b is $\leq 3$, and (c) at least two siloxane units of the general formula

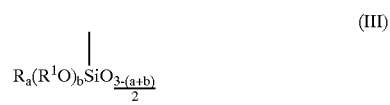

(III)

where R, R1, a and b are each as defined above, with the proviso that the sum of a+b is $\leq 2$ and that the siloxane units of the formula (III) are bonded through the silicon atoms to the structural unit of the formula (I) through the R2 radicals.

The present invention further provides ammonio-containing organosilicon compounds preparable by in a first stage reacting (poly)amines (1) of the general formula

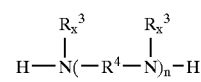

(IV)

where $R^3$, $R^4$, n and x are each as defined above, with epoxy-containing organosilicon compounds (2) containing units of the general formula

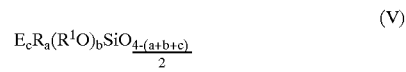

(V)

where R, $R^1$, a and b are each as defined in claim 1, each E is the same or different and represents a monovalent SiC-attached organic radical which contains an epoxy group, and c is 0 or 1, with the proviso that the sum of a+b+c is $\leq 3$ and that at least one E radical is present per molecule, with the proviso that the employed ratio of N-attached hydrogen in (poly)amine (1) to epoxy group in organosilicon compound (2) is such that toluene-soluble amino-containing organosilicon compounds are obtained,
and in a second stage protonating
the amino-containing organosilicon compounds obtained in the first stage by addition of acids (4) partially or fully, ammonio-containing organosilicon compounds being obtained that are soluble in isopropanol or diethylene glycol monobutyl ether.

The present invention further provides a process for preparing the ammonio-containing organosilicon compounds, characterized in that it comprises
in a first stage reacting
(poly)amines (1) of the general formula

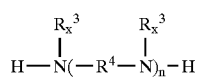 (IV)

where $R^3$, $R^4$, n and x are each as defined above,
with epoxy-containing organosilicon compounds (2) containing units of the general formula

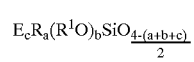 (V)

where R, $R^1$, a and b are each as defined above,
each E is the same or different and represents a monovalent SiC-attached organic radical which contains an epoxy group, and
c is 0 or 1,
with the proviso that the sum of a+b+c is $\leq 3$ and that at least one E radical is present per molecule,
with the proviso that the employed ratio of N-attached hydrogen in (poly)amine (1) to epoxy group in organosilicon compound (2) is such that toluene-soluble amino-containing organosilicon compounds are obtained,
and in a second stage protonating
the amino-containing organosilicon compounds obtained in the first stage by addition of acids (4) partially or fully, ammonio-containing organosilicon compounds being obtained that are soluble in isopropanol or diethylene glycol monobutyl ether.

The amino-containing organosilicon compounds obtained in the first stage by the process of the present invention are soluble in toluene, i.e. uncrosslinked organosilicon compounds are obtained, in contradistinction to toluene-insoluble organosilicon compounds which are crosslinked. The organosilicon compounds obtained are soluble in toluene in any proportion and are preferably 100 percent by weight soluble in toluene at a temperature of 25° C. and a pressure of about 1020 hPa when the organosilicon compounds and toluene are mixed in a ratio of 1:1 (parts by weight) and preferably 1:10 (parts by weight).

The process of the invention provides, in the second stage, ammonio-containing organosilicon compounds which are soluble in isopropanol or diethylene glycol monobutyl ether, i.e. uncrosslinked organosilicon compounds are obtained, in contradistinction to isopropanol- or diethylene glycol monobutyl ether-insoluble organosilicon compounds which are crosslinked. The organosilicon compounds obtained are soluble in isopropanol or diethylene glycol monobutyl ether in any proportion and are preferably 100 percent by weight soluble in isopropanol or diethylene glycol monobutyl ether at a temperature of 25° C. and a pressure of about 1020 hPa when organosilicon compounds and isopropanol or diethylene glycol monobutyl ether are mixed in a ratio of 1:1 (parts by weight) and preferably 1:10 (parts by weight).

The ammonio-containing organosilicon compounds of the invention contain siloxane blocks which are joined together through at least one di- or polyvalent ammonium radical. The ammonium nitrogen content is preferably from 0.01 to 5.0% by weight and more preferably from 0.1 to 5.0% by weight, each percentage being based on the total weight of the ammonio-containing organosilicon compounds.

The viscosity of the inventive ammonio-containing organosilicon compounds is preferably 50-5 000 000 mPa.s at 25° C. and more preferably 100-100 000 mPa·s at 25° C.

Examples of R radicals are alkyl radicals, such as methyl, ethyl, n-propyl, isopropyl, n-butyl, isobutyl, tert-butyl, n-pentyl, isopentyl, neopentyl, tert-pentyl, hexyl, such as n-hexyl, heptyl, such as n-heptyl, octyl, such as n-octyl and isooctyl, such as 2,2,4-trimethylpentyl, nonyl, such as n-nonyl, decyl, such as n-decyl, dodecyl, such as n-dodecyl, and octadecyl, such as n-octadecyl, cycloalkyl, such as cyclopentyl, cyclohexyl, cycloheptyl and methylcyclohexyl, aryl, such as phenyl, naphthyl, anthryl and phenanthryl, alkaryl, such as o-, m-, p-tolyl, xylyl and ethylphenyl, and aralkyl, such as benzyl, α-phenylethyl and β-phenylethyl.

Examples of substituted R radicals are haloalkyl, such as 3,3,3-trifluoro-n-propyl, 2,2,2,2',2',2'-hexafluoroisopropyl, heptafluoroisopropyl and haloaryl, such as o-, m- and p-chlorophenyl.

R is preferably methyl.

Examples of $R^1$ radicals are alkyl, such as methyl, ethyl, n-propyl, isopropyl, n-butyl, isobutyl, tert-butyl, n-pentyl, isopentyl, neopentyl, tert-pentyl, hexyl, such as n-hexyl, heptyl, such as n-heptyl, octyl, such as n-octyl and isooctyl, such as 2,2,4-trimethylpentyl.

$R^2$ is preferably a radical of the general formula

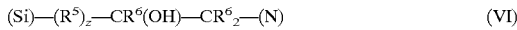 (VI)

or

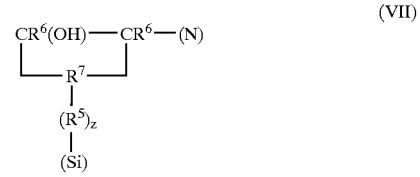 (VII)

where (Si)— is the bond to the silicon atom of the siloxane unit of the formula (III) and —(N) is the bond to the nitrogen atom of the structural unit of the formula (I),
$R^5$ is a divalent hydrocarbon radical having 1 to 10 carbon atoms per radical which may be substituted by an ether oxygen atom,
$R^6$ is a hydrogen atom or a monovalent hydrocarbon radical having 1 to 10 carbon atoms per radical which may be substituted by an ether oxygen atom,
$R^7$ is a trivalent hydrocarbon radical having 3 to 12 carbon atoms per radical, and
z is 0 or 1.

Examples of $R^2$ radicals are aliphatic, cycloaliphatic and aromatics-containing divalent organic radicals which contain hydroxyl functions from the epoxide ring opening such as

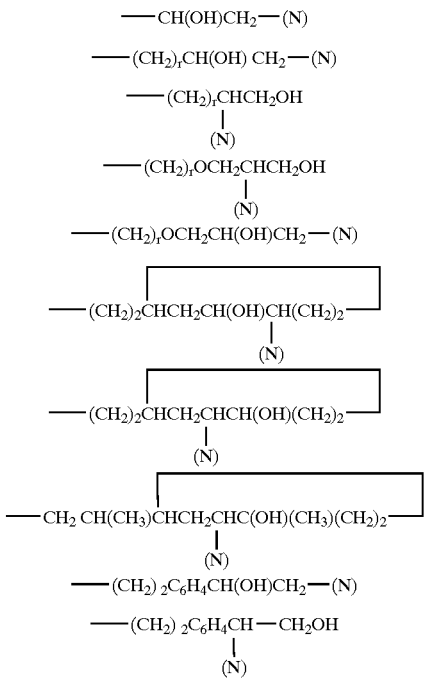

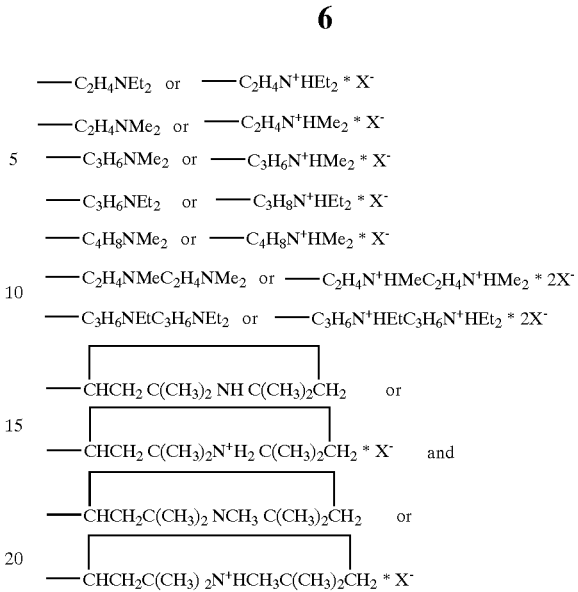

where r is an integer from 1 to 20 and preferably from 2 to 8, and —(N) is the bond to the nitrogen atom of the structural unit of the formula (I).

Preferred $R^2$ radicals are

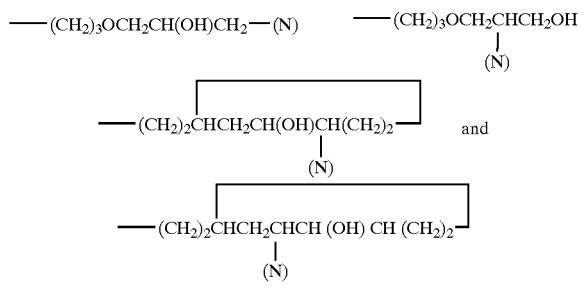

and the first two radicals are particularly preferred.

Examples of $R^3$ hydrocarbon radicals are alkyl radicals, such as methyl, ethyl, n-propyl, isopropyl, n-butyl, isobutyl, tert-butyl, n-pentyl, isopentyl, neopentyl, tert-pentyl, hexyl, such as n-hexyl, heptyl, such as n-heptyl, octyl, such as n-octyl and isooctyl, such as 2,2,4-trimethylpentyl, nonyl, such as n-nonyl, decyl, such as n-decyl, dodecyl, such as n-dodecyl, and octadecyl, such as n-octadecyl, cycloalkyl, such as cyclopentyl, cyclohexyl, cycloheptyl and methylcyclohexyl, aryl, such as phenyl, naphthyl, anthryl and phenanthryl, alkaryl, such as o-, m-, p-tolyl, xylyl and ethylphenyl, and aralkyl, such as benzyl, α-phenylethyl and β-phenylethyl.

Examples of $R^3$ halogenated radicals are haloalkyl, such as 3,3,3-trifluoro-n-propyl, 2,2,2,2',2',2'-hexafluoroisopropyl, heptafluoroisopropyl and haloaryl, such as o-, m- and p-chlorophenyl.

Examples of $R^3$ radicals substituted by a nitrogen atom are as the case may be —$C_2H_4NEt_2$ or —$C_2H_4N^+HEt_2$ * $X^-$ —$C_2H_4NMe_2$ or —$C_2H_4N^+HMe_2$ * $X^-$ —$C_3H_6NMe_2$ or —$C_3H_6N^+HMe_2$ * $X^-$ —$C_3H_6NEt_2$ or —$C_3H_8N^+HEt_2$ * $X^-$ —$C_4H_8NMe_2$ or —$C_4H_8N^+HMe_2$ * $X^-$ —$C_2H_4NMeC_2H_4NMe_2$ or —$C_2H_4N^+HMeC_2H_4N^+HMe_2$ * $2X^-$ —$C_3H_6NEtC_3H_6NEt_2$ or —$C_3H_6N^+HEtC_3H_6N^+HEt_2$ * $2X^-$

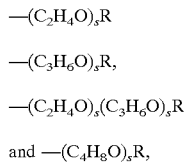

where Me is methyl and Et is ethyl.

Examples of $R^3$ radicals substituted by an oxygen atom are

—$(C_2H_4O)_sR$

—$(C_3H_6O)_sR$,

—$(C_2H_4O)_s(C_3H_6O)_sR$ and —$(C_4H_8O)_sR$, where s is an integer from 1 to 30, preferably from 1 to 20 and R is as defined above, preferably is methyl or butyl.

Examples of $R^3$ radicals which are substituted by a nitrogen atom and an oxygen atom are as the case may be —$(C_2H_4O)_sC_3H_6NR^1{}_2$ or —$(C_2H_4O)_sC_3H_6N^+HR^1{}_2{}^*X^-$ —$(C_3H_6O)_sC_3H_6NR^1{}_2$ or —$(C_3H_6O)_sC_3H_6N^+HR^1{}_2{}^*X^-$ and —$(C_2H_4O)_s(C_3H_6O)_sC_3H_6NR^1{}_2$ or —$(C_2H_4O)_s(C_3H_6O)_sC_3H_6N^+HR^1{}_2{}^*X^-$, where s, $R^1$ and $X^-$ are each as defined above and $R^1$ is preferably methyl or ethyl.

Examples of $R^3$ radicals substituted by a sulfur atom are

—$(C^2H^4S)_sR$ and

—$(C^3H^6S)_sR$, where s and R are each as defined above and R is preferably methyl, ethyl or butyl.

Examples of $R^4$ radicals are

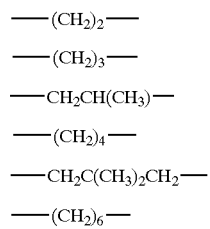

-continued

—(CH$_2$)$_8$—

—(CH$_2$)$_{10}$—

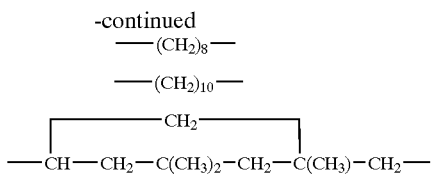

and radicals having at least three carbon atoms are preferred and the radicals

—(CH$_2$)$_3$—, —(CH$_2$)$_6$—, —CH$_2$C(CH$_3$)$_2$CH$_2$— and

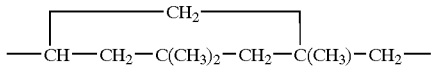

are particularly preferred.

n is preferably 0, 1, 2, 3, 4, 5, 6, 7, 8, 9 and 10.

The process of the invention can be practiced with one kind of (poly)amine (1) or various kinds of (poly)amines (1).

Examples of (poly)amines (1) are primary amines of the general formula R$^3$—NH$_2$
where R$^3$ is an alkyl radical,
primary amines of the general formula R$^3$—NH$_2$,
where R$^3$ is a radical which is substituted by a nitrogen atom, such as Me$_2$NC$_2$H$_4$NH$_2$ Et$_2$NC$_2$H$_4$NH$_2$ Me$_2$NC$_3$H$_6$NH$_2$ Et$_2$NC$_3$H$_6$NH$_2$ Me$_2$NC$_4$H$_8$NH$_2$ Me$_2$NC$_2$H$_4$NMeC$_2$H$_4$NH$_2$ Et$_2$NC$_3$H$_6$NEtC$_3$H$_6$NH$_2$ 4-amino-2,2,6,6-tetramethylpiperidine 4-amino-1,2,2,6,6-pentamethylpiperidine, and N-(2-aminoethyl)piperazine, primary amines of the general formula R$^3$—NH$_2$, where R$^3$ is a radical substituted by an oxygen atom, such as EtO(C$_2$H$_4$O)$_s$C$_3$H$_6$NH$_2$ BuO(C$_3$H$_6$O)$_s$C$_3$H$_6$NH$_2$ Me(C$_2$H$_4$O)$_s$(C$_3$H$_6$O)C$_3$H$_6$NH$_2$ and MeO(C$_4$H$_8$O)$_s$C$_3$H$_6$NH$_2$, primary amines of the general formula R$^3$—NH$_2$, where R$^3$ is a radical substituted by an oxygen atom and a nitrogen atom, such as Me$_2$NC$_3$H$_6$(C$_2$H$_4$O)$_s$C$_3$H$_6$NH$_2$ and Et$_2$N(C$_3$H$_6$O)$_s$(C$_2$H$_4$O)$_s$C$_3$H$_6$NH$_2$, where s is as defined above,
Me is methyl, Et is ethyl and Bu is n-butyl.

Further examples of (poly)amines (1) are ethylenediamine, propylenediamine, diethylenetriamine, dipropylenetriamine, triethylenetetramine and tetraethylenepentamine.

The E radicals preferably conform to the formula

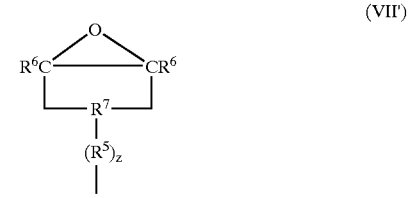

where R$^5$, R$^6$, R$^7$ and z are each as defined above.

Preferably, in the formula (V):
a is on average from 1.0 to 2.0 and
c is on average from 0.002 to 1.0.

The process of the invention can be practiced with one kind of organosilicon compound (2) or various kinds of organosilicon compounds (2).

The process of the invention is preferably carried out using epoxy-containing organosilicon compounds (2) conforming to the general formula $$E_dR_{3-d}SiO(SiR_2O)_o(SiREO)_pSiR_{3-d}E_d \quad (VIII),$$

where R and E are each as defined above,
d is 0 or 1, and especially 1,
o is 0 or an integer from 1 to 1 000 and especially from 5 to 200, and
p is 0 or an integer from 1 to 10, preferably 0 or from 1 to 6 and more preferably 0.

The viscosity of the epoxy-containing organosilicon compounds (2) is preferably in the range from 1 to 100 000 mPa·s at 25° C. and more preferably in the range from 10 to 2 000 mPa·s at 25° C.

Examples of E radicals are 3,4-epoxybutyl, 5,6-epoxyhexyl, 7,8-epoxyoctyl, glycidoxyethyl, glycidoxypropyl, 2-(3,4-epoxycyclohexyl)ethyl, 2-(3-epoxyphenyl)ethyl and also epoxy itself,
of which glycidoxypropyl and 2-(3,4-epoxycyclohexyl) ethyl are preferred and glycidoxypropyl is particularly preferred.

Processes for preparing epoxy-containing organosilicon compounds (2) are known to one skilled in the art.

Preferred embodiments are the epoxidation of aliphatically unsaturated organopolysiloxanes and the addition of terminally unsaturated organic epoxy compounds, such as allyl glycidyl ether or 4-vinylcyclohexene oxide, which is catalyzed by precious metal (Compounds), to organopolysiloxanes containing silicon-attached hydrogen.

The epoxy-containing organosilicon compounds (2) used in the process of the invention preferably contain from 1 to 10 and especially from 1 to 6 epoxy groups per molecule. A particularly preferred embodiment is the use of α,ω-diepoxypolysiloxanes.

The inventive process for ring opening and polyaddition of the epoxy functions with (poly)amines (1) requires amines having at least 2 N-attached hydrogen atoms. Preference is given to using (poly)amines (1) containing from 2 to 10 nitrogen-attached hydrogen atoms and especially containing from 2 to 6 nitrogen-attached hydrogen atoms. The number of nitrogen atoms per molecule is initially not dependent thereon but is preferably in the range from 1 to 4.

The process of the invention may optionally employ amines (3) having just one N—H group per molecule, since these act as chain stoppers and thus render the polyaddition controllable.

Any amines (3) used preferably conform to the general formula

where $R^8$ and $R^9$ are the same or different and each represent a monovalent hydrocarbon radical having 1 to 60 carbon atoms per radical which may be interrupted by one or more separate heteroatoms selected from the group consisting of nitrogen and oxygen, or $R^8$ and $R^9$ together represent a divalent hydrocarbon radical having 4 to 10 carbon atoms.

Examples of amines (3) are dibutylamine, piperidine, diethanolamine, trimethylethylenediamine, bis(2-diethylaminoethyl)amine and bis(3-dimethylaminopropyl) amine.

Amines (3), when used, are preferably used in amounts from 5 to 40% by weight, based on the total weight of the (poly)amines (1).

In the process of the invention, the ratio of (poly)amines (1) to epoxy-containing organosilicon compounds (2) is preferably in the range from 1:1 to 10:1, more preferably in the range from 1:1 to 5:1 and most preferably in the range from 1:1 to 4:1.

In the process of the invention, the stoichiometry of the reaction depends on the ratio of nitrogen-attached hydrogen in (1) to epoxy groups in (2) (N—H/epoxy). This N—H/epoxy ratio can be varied within wide limits, according to the nature of the ingredients and the target range for the viscosities of the inventive organosilicon compounds. But preferably the N—H/epoxy ratio is not less than $\geq 1$ in order that all the epoxy groups can react, subject to the condition that toluene-soluble, ie uncrosslinked, products are obtained. A person of ordinary skill in the art knows how to vary the N—H/epoxy ratio in the process of the present invention as a function of the N—H groups in (1) and epoxy groups in (2), ie the functionality of the reagents, for example experimentally by carrying out tests, so that toluene-soluble products may be obtained. Since secondary reactions and also incomplete reaction sequences with conversions below 100% of theory play a part, a person of ordinary skill in the art knows that possible limits must be determined experimentally if particularly viscous products are to be prepared.

The ammonio-containing organosilicon compounds of the present invention are obtained on the amino-containing organosilicon compounds obtained from (1) and (2) with or without use of (3) in the first stage of the process according to the present invention being reacted with acids (4) in a second stage.

In the process of the invention, any kind of acid (4) or various kinds of acids (4) can be used.

It is preferable to use water-soluble organic or inorganic acids (4).

Examples of acids (4) are monocarboxylic acids of the general formula R'—COOH (Xa) where R' is a hydrogen atom or a hydrocarbon radical having 1 to 18 carbon atoms per radical, such as formic acid, acetic acid, propionic acid, butyric acid, pivalic acid, sorbic acid, benzoic acid, salicylic acid and toluylic acid, and dicarboxylic acids of the general formula HOOC—$R^5$—COOH (Xb), where $R^5$ is as defined above, such as succinic acid, maleic acid, adipic acid, malonic acid and phthalic acid, and the monocarboxylic acids are preferred. Particular preference is given to formic acid, acetic acid and propionic acid.

Further examples of acids (4) are sulfonic acids of the general formula R'—SO$_3$H (Xc) where R' is as defined above, such as methanesulfonic acid, butanesulfonic acid, trifluoromethanesulfonic acid and toluenesulfonic acid, and also inorganic acids, such as hydrochloric acid, hydrobromic acid, sulfuric acid and phosphoric acid.

Examples of R' hydrocarbon radicals are the hydrocarbon radicals R.

Accordingly, the organosilicon compounds according to the present invention preferably contain the corresponding $X^-$ anions of the acids used. Preferably, $X^-$ is an anion of a corresponding water-soluble organic or inorganic acid. Examples of $X^-$ anions are therefore R'—COO$^-$ (Xa'), $^-$OOC—$R^5$—COO$^-$ (Xb') and R'—SO$_3^-$ (Xc'), where R' and $R^5$ are each as defined above.

When, thus, the reaction products from (1) and (2) in the second stage of the process of the invention are reacted with, for example, acetic acid, the organosilicon compounds according to the present invention will contain the acetate anions corresponding to the protonated nitrogen atoms.

In the second stage of the process of the invention, the acids (4) are preferably used in amounts of from 0.1 to 2.0 gram equivalents and more preferably from 0.5 to 1.5 gram equivalents, each numerical value being based on the amine nitrogen of the amino-containing organosilicon compounds obtained in the first stage.

When, thus, 1 kg of the amino-containing organosilicon compounds obtained in the first stage contains 14 g of basic nitrogen, it is for example preferable to use from 6 to 120 g of acetic acid and more preferable to use from 30 to 90 g of acetic acid. The use of from 6 to 60 g of acetic acid leads in this example to a partial protonation, ie not all the basic nitrogen atoms of the amino-containing organosilicon compounds obtained in the first stage are protonated. The use of 60 g of acetic acid or more provides fully protonated products, the excess acid serving to regulate the pH of the inventive ammonio-containing organosilicon compounds. The pH of the inventive organosilicon compounds can be lowered still further by adding even more acid. Mixtures of this type exhibit the characteristics of buffered systems.

It is preferable for all the nitrogen atoms in the inventive organosilicon compounds to be protonated, including any nitrogen atoms in the $R^3$ radicals, so that there are obtained as structural unit of the formula (I) preferably those of the formula

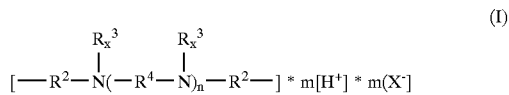

or, written differently,

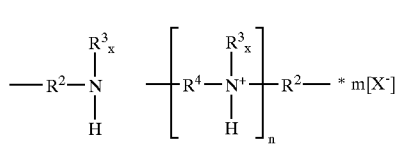

(I')

where m is equal to the sum formed from n+1 and the total number of any basic nitrogen atoms present in the $R^3$ radicals, [ie at most m=n+1+(n+1)Σ(N atoms in $R^3$)]$R^2$, $R^3$, $R^4$ and $X^-$ are each as defined above, with the proviso that any basic nitrogen atoms present in $R^3$ are protonated.

The end groups of the organosilicon compounds obtained in the first stage of the process according to the present invention are—depending on the employed N—H/epoxy ratio of (1) and (2) and the optionally used amines (3)— preferably amino groups which come from (1) or (3), but can also be, for example by incomplete conversion, epoxy group which come from (2).

Preferably, the organosilicon compounds of the present invention can therefore contain (d) end units of the general formula

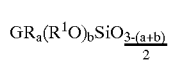

(XI)

where R, $R^1$, a and b are each as defined above, and G is a radical of the formula

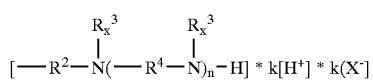

(XII)

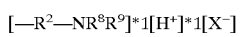

(XIII)

or is E, where $R^2$, $R^3$, $R^4$, $R^8$, $R^9$, n and E are each as defined above, k is an integer from 1 to the total number of the nitrogen atoms in (XII), preferably from 1 to the sum formed from n+1 and the total number of any basic nitrogen atoms in the $R^3$ radicals, l is an integer from 1 to the sum formed from 1 and the total number of any basic nitrogen atoms in $R^8$ and $R^9$.

Since preferably all nitrogen atoms are protonated in the process of the present invention, the organosilicon compounds of the present invention preferably contain end units of the formula

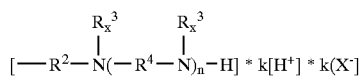

(XII)

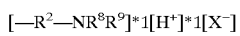

(XIII)

or, written differently

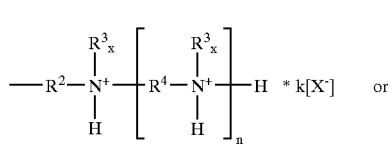

(XII')

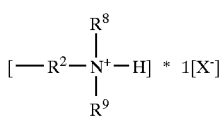

(XIII')

where $R^2$, $R^3$, $R^4$, $R^8$, $R^9$ and $X^-$ are each as defined above, with the proviso that any basic nitrogens in $R^3$, $R^8$ and $R^9$ are protonated, k is equal to the sum formed from n+1 and the total number of any basic nitrogens in the $R^3$ radicals, and l is equal to the sum formed from 1 and the total number of any basic nitrogen atoms in $R^8$ and $R^9$.

The process of the present invention can utilize inert organic solvents, although the use of inert organic solvents is not preferred.

The first stage of the process according to the present invention is preferably carried out without the use of acids during the reaction of (1) and (2), and is preferably carried out in the pH range>7.

Acids are preferably not used until after conclusion of the reaction of (1) with (2) in the second stage of the process according to the present invention.

The preparation of the organosilicon compounds according to the present invention in the first stage of the process according to the present invention does not in principle require any catalysts. If desired, however, catalysts can be used, preferably catalysts which are also used to speed epoxide curing. Suitable catalysts for speeded production of the organosilicon compounds according to the present invention are phenols, secondary alcohols or tertiary amines.

The process of the present invention is preferably carried out in the first stage at temperatures above 25° C., although there is detectable reaction even at the normal, ambient temperature. But temperatures above 60° C. are preferable, temperatures in the range from 80 to 180° C. are more preferable and temperatures between 100 and 150° C. are most preferable in the interests of a rapid and complete reaction. The process of the present invention is preferably carried out at the pressure of the ambient atmosphere, ie at about 1000 hPa, although particularly in the case of volatile (poly)amines (1) an elevated pressure is advantageous in order that losses of N—H functions through evaporation and hence a change in the stoichiometry may be avoided.

The process of the present invention can be carried out not only as a metering process but also as a one-pot process in which the components (1) and (2) and, as the case may be, (3) are present from the start as a homogeneous mixture.

The process of the present invention can be carried out batchwise, semicontinuously or fully continuously.

The amino-containing organosilicon compounds obtained after the reaction of (1) with (2) have basic properties of the kind also known from commercially customary amine oils. They can therefore react with acids by salt formation and so alter their solubility characteristics. Depending on the structure and amine number, it is thus possible to create hydrophilic properties with the consequence that it is possible to obtain products of this kind which are self-emulsifiable or even soluble in water.

The organosilicon compounds of the present invention are advantageous over conventional ammoniosiloxanes in that virtually all desired structures are very simple and economical to construct. The preparation of ammoniosiloxanes as per the prior art relies on the use of aminosilanes which are converted into polysiloxanes in subsequent steps (hydrolysis, condensation, equilibration). Owing to the limited number of monomers which are commercially available, the scope for varying this synthetic route is obviously very limited.

By contrast, the present invention, via polymer-analogous reactions, provides access to an extraordinarily large diversity of ammoniosiloxanes from the large pallet of commercial organic amines or polyamines and hence the functionalization of the siloxane precursor, the simultaneous polymer construction and the protonation in one reaction step.

The organosilicon compounds according to the present invention can be used in fields where ammoniosiloxanes have hitherto been used, chiefly as softeners for substrates such as fibers, textiles, hair; ie polymer-based natural or synthetic substrates. A use as undiluted oils/polymers is possible in specific cases, but application from aqueous solution, emulsion or dispersion is preferable.

Such diluted administration forms may advantageously be stabilized in many cases by nonaqueous but water-compatible solvents, such as isopropanol, diethylene glycol monomethyl ether, diethylene glycol monobutyl ether, dipropylene glycol or dipropylene glycol monomethyl ether.

These solvents can be added before or after the addition of acids (4). But it is preferable to add such solvents before any dilution with water.

If desired, it is also possible to use emulsifiers to prepare aqueous dilutions, in which case nonionic emulsifiers are preferred.

The present invention further provides a process for impregnating organic fibers with the organosilicon compounds according to the present invention.

The inventive process for impregnating organic fibers can be applied to any organic fiber in the form of filaments, yarns, webs, mats, strands, woven, loop-formingly knitted or loop-drawingly knitted textiles that have hitherto been impregnable with organosilicon compounds. Examples of fibers which are impregnable are fibers composed of keratin, especially wool, polyvinyl alcohol, copolymers of vinyl acetate, cotton, rayon, hemp, natural silk, polypropylene, polyethylene, polyester, polyurethane, polyamide, cellulose and blends of at least two thereof. As is evident from the foregoing enumeration, the fibers can be of natural or synthetic origin. The textiles can be present in the form of fabric webs or garments or parts of garments.

The organosilicon compounds employed in the process of the present invention can be applied in undiluted form or in the form of solutions in organic solvent or in the form of aqueous emulsions to the fiber to be impregnated. When aqueous emulsions are employed for this purpose, these emulsions, in addition to water, dispersant and the organosilicon compounds to be dispersed, can contain thickeners, such as poly-N-vinylpyrrolidone. It is preferable to impregnate with organosilicon compounds according to the present invention which are self-emulsifiable or soluble in water. The organosilicon compounds of the present invention which are employed for impregnation can also be applied in the form of aqueous emulsions to the fibers to be impregnated. Dispersants used in these emulsions are preferably nonionic, anionic or cationic emulsifiers. These emulsions can be prepared in a manner known for the emulsification of organopolysiloxanes.

Application to the fibers to be impregnated can be effected in any of the extensively described methods useful for impregnating fibers, for example by dipping, coating, casting, spraying, including spraying from an aerosol pack, rolling, padding or printing.

The organosilicon compounds according to the present invention can further also be used in formulations such as creams, shaving foams, shampoos, washing lotions, soaps, deodorants or hairsprays.

A further emphasis is on the use for treating mineral materials, specifically for hydrophobicizing surfaces. Preference is here given to silicatic surfaces, to which the organosilicon compounds according to the present invention exhibit particularly good adhesion. The present invention accordingly provides a process for impregnating silicatic surfaces, especially glass, ceramics and natural rock, with the organosilicon compounds according to the present invention.

EXAMPLE 1

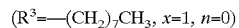
($R^3$=—$(CH_2)_7 CH_3$, $x$=1, $n$=0)

A homogeneous mixture is prepared from 159.6 g of an α,ω-bis(glycidyloxypropyl)polydimethylsiloxane of chain length Si-13 and 24.3 g of n-octylamine and is reacted at 130° C. for three hours, in the course of which the viscosity increases markedly and the oil takes on a yellowish hue. Conversion of the epoxy groups is almost quantitative ($^1$H NMR) and the final viscosity is 6 350 mm$^2$/s at 25° C. The oil has an amine number of 0.98 (meq./g) and is soluble in toluene in a ratio of 1:1 (parts by weight). The product is homogeneously mixed with 13.5 g of acetic acid and is subsequently soluble in both isopropanol and water.

EXAMPLE 2

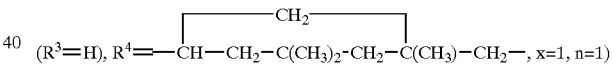
($R^3$=H), $R^4$=—CH—$CH_2$—$C(CH_3)_2$-$CH_2$—$C(CH_3)$—$CH_2$—, $x$=1, $n$=1)

150 g of an α,ω-bis(glycidyloxypropyl) polydimethylsiloxane having an average chain length of Si-51 are mixed with 8.02 g of isophoronediamine and 4.5 g of isopropanol until homogeneous and maintained at 110° C. for 24 hours. The siloxane polymer obtained is 60 Pa.s at 25° C., forms a clear solution in the same amount of toluene and is free of gel fractions. The $^1$H NMR spectrum no longer shows any epoxy protons (detection limit about 1%). The amino-functional siloxane polymer has an amine number of 0.59 (meq./g).

108.40 g of polymer are dissolved in the same amount of diethylene glycol monobutyl ether and admixed with 5 g of acetic acid. The viscosity of this solution is 2 290 mm$^2$/s at 25° C. at a pH of 6.5. Twice the amount of water spontaneously gives a slightly yellowish clear solution which can be further diluted without precipitation.

EXAMPLE 3

Example 2 is repeated except that the 8.02 g of isophoronediamine are replaced by 12.82 g of isophoronediamine. Quantitative conversion of the epoxy groups gives a slightly yellowish clear oil which, at a viscosity of only 1 020 mm$^2$/s at 25° C., is appreciably thinner. The solubility tests show the same result as Example 2.

EXAMPLE 4

($R^3$=H, $R^4$=—$C_2H_4$—, x=1, n=3)

134.2 g of the epoxysiloxane of Example 2 are mixed with 6.41 g of triethylenetetramine and 58 g of diethylene glycol monobutyl ether and heated, which causes the mixture to become homogeneous. After 2.5 hours at 130° C. the substantially increased viscosity remains constant. The polymer is soluble in toluene in a ratio of 1:1 (parts by weight). A further 82 g of solvent are added to dilute the siloxane content to 50% and 11.6 g of acetic acid are stirred in during cooling. The solution obtained is clear, has an intensive yellow color and a viscosity of 2 130 mm$^2$/s at 25° C. and contains 0.60 meq. of amine nitrogen per kg in protonated form. Three times the amount of water and thorough stirring converts this solution into a neutral clear aqueous solution which is further dilutable with water without polymer precipitating.

EXAMPLE 5

($R^3$=H, $R^4$=—$C_3H_6$—, x=1, n=2)

197.8 g of the epoxysiloxane of example 2 are mixed with 7.64 g of bis(3-aminopropyl)amine and 206 g of diethylene glycol monobutyl ether and also 5.8 g of isopropanol and heated, whereby a homogeneous mixture is obtained. At 130° C. the viscosity increases from 23 mm$^2$/s at 25° C. to a final value of 10 100 mm$^2$/s at 25° C. over a period of 60 minutes. No further increase in viscosity is observed. The polymer is soluble in toluene in a ratio of 1:1 (parts by weight). Epoxy functions are no longer detectable in the $^1$H NMR spectrum. 11.5 g of acetic acid are stirred in during cooling. The siloxane polymer solution contains 0.41 meq. of amine nitrogen per kg in protonated form. Three times the amount of water gives a clear aqueous solution which has a neutral pH and which remains clear on further dilution.

EXAMPLE 6

($R^3$=H, $R^4$=—$CH_2$—$C(CH_3)_2$—$CH_2$—, x=1, n=1)

52.1 g of a short-chain bis(glycidyloxypropyl) polydimethylsiloxane as used in example 1 are mixed with 7.7 g of neopentanediamine. The mixture is completely clear at 25° C. even without solvent. After 24 hours at 110° C. all epoxy functions have reacted. The polymer is soluble in toluene at a ratio of 1:1 (parts by weight). The colorless oil is neutralized with 9.9 g of acetic acid and diluted with 10 times the amount of water. This gives a clear colorless solution which is free of glycol compounds and which is readily further dilutable. The oil which has been treated with acetic acid forms a clear and complete solution in the same amount of isopropanol.

EXAMPLE 7

($R^3$=H, $R^4$=—$CH_2$—$C(CH_3)_2$—$CH_2$—, x=1, n=1)

102.0 g of an α,ω-epoxysilane having 0.294 meq. of glycidyl groups per kg and hence an average chain length of about 90 siloxane units are solventlessly mixed with 1.91 g of neopentanediamine until homogeneous and heated at 110° C. for 24 hours. The colorless high polymer obtained has a viscosity of more than 1 000 Pa.s at 25° C. The amino-functional siloxane polymer has an amine number of 0.35 (meq/g) and forms a clear solution in ten times the amount of toluene without formation of gel deposits. The high polymer is diluted with nine times the amount of isopropanol and treated with 2.5 g of acetic acid. This gives a clear solution having a neutral pH.

EXAMPLE 8

102.0 g of the epoxy oil of example 2 are mixed with 3.8 g of 3-dimethylaminopropylamine and 3.0 g of isopropanol, stirred at 125° C. for three hours and subsequently heated out at 120° C. under reduced pressure. The viscous polymer is mixed with 5.0 g of acetic acid and diluted with 103 g of isopropanol to form a clear solution which contains 0.35 g equivalent of protonated nitrogen per kg.

30 g of this solution are admixed with 70 g of water by vigorous stirring. The clear aqueous solution is readily further dilutable with further water.

EXAMPLE 9

50 ml of deionized water are introduced into a freshly cleaned borosilicate glass flask and the sealed flask is then vigorously shaken. Perfect wetting of the inner surface of the flask is observed. The glass flask is substantially emptied, not dried, but wetted as completely as possible on the inner surface with 5 g of the aqueous solution of example 2. Thereafter, the flask is reemptied and rinsed five times with about 100 ml of deionized water. Water which is introduced now is no longer able to wet the inner surface of the flask. Water which has been force-distributed by shaking will bead off the glass surface in fractions of a second. This effect will still be there unchanged three months later.

EXAMPLE 10

Example 9 is repeated mutatis mutandis using a plate of ordinary window glass. The moist glass plate is treated with the aqueous solution of example 2 by using a sponge to distribute some ml of the solution uniformly over the surface. The hydrophobicizing effect is distinctly visible after extensive rinsing with tap water. Water sprayed onto the inclined glass plate beads off instantaneously.

EXAMPLE 11

An unglazed tile is treated in the same way as the glass plate in Example 10. Applied tap water is no longer able to wet the surface and beads off instantly.

EXAMPLE 12

A nylon plate is surface treated by dipping into the aqueous solution of Example 2. After extensive rinsing with tap water, it is found that sprayed-on tap water beads off significantly faster and more completely than off the untreated nylon surface.

What is claimed is:

1. Ammonio-containing organosilicon compounds which are soluble in isopropanol or diethylene glycol monobutyl ether and contain (a) at least one structural unit of the general formula $$[-R^2-\underset{\underset{R_x^3}{|}}{N}(-R^4-\underset{\underset{R_x^3}{|}}{N})_n-R^2-] * m[H^+] * m(X^-) \quad (I)$$

where $R^2$ is a divalent organic radical which contains a hydroxyl group from a ring-opening of an epoxy group, $R^3$ is a hydrogen atom or a monovalent hydrocarbon radical having 1 to 60 carbon atoms per radical which may be interrupted or substituted by one or more separate hetero atoms selected from the group consisting of nitrogen, oxygen, sulfur and halogen, $R^4$ is a divalent hydrocarbon radical having 1 to 10 carbon atoms per radical, n is 0 or an integer from 1 to 10, m is an integer from 1 to the total number of nitrogen atoms in (I), and each x is the same or different and represents 0 or 1, $X^-$ is an anion;

(b) at least one siloxane unit of the general formula $$R_a(R^1O)_bSiO_{\frac{4-(a+b)}{2}} \quad (II)$$

where each R is the same or different and represents a monovalent optionally halogenated hydrocarbon radical having 1 to 18 carbon atoms, each $R^1$ is the same or different and represents a monovalent hydrocarbon radical having 1 to 8 carbon atoms per radical, a is 0, 1, 2 or 3, b is 0, 1, 2 or 3, with the proviso that the sum of a+b is $\leq 3$;

and (c) at least two siloxane units of the general formula $$R_a(R^1O)_bSiO_{\frac{3-(a+b)}{2}} \quad (III)$$

where R, $R^1$, a and b are each as defined above, with the proviso that the sum of a+b is $\leq 2$ and that the siloxane units of the formula (III) are bonded through the silicon atoms to the structural unit of the formula (I) through the $R^2$ radicals.

2. The ammonio-containing organosilicon compounds of claim 1, wherein $R^2$ is a radical of the general formula $$(Si)-(R^5)_z-CR^6(OH)-CR^6{}_2-(N) \quad \text{or} \quad (VI)$$

$$\begin{array}{c} CR^6(OH)-CR^6-(N) \\ \phantom{CR^6(OH)} \underset{|}{\overset{|}{\phantom{X}}} R^7 \underset{}{\phantom{X}} \\ \phantom{CR^6(OH)} (R^5)_z \\ \phantom{CR^6(OH)} | \\ \phantom{CR^6(OH)} (Si) \end{array} \quad (VII)$$

where (Si)— is the bond to the silicon atom of the siloxane unit of the formula (III) and —(N) is the bond to the nitrogen atom of the structural unit of the formula (I), $R^5$ is a divalent hydrocarbon radical having 1 to 10 carbon atoms per radical which may be substituted by an ether oxygen atom, $R^6$ is a hydrogen atom or a monovalent hydrocarbon radical having 1 to 10 carbon atoms per radical which may be substituted by an ether oxygen atom, $R^7$ is a tervalent hydrocarbon radical having 3 to 12 carbon atoms per radical and z is 0 or 1.

3. The ammonio-containing organosilicon compounds of claim 1, wherein $R^4$ is a radical of the formula —$(CH_2)_3$—.

4. Ammonio-containing organosilicon compounds prepared by a process comprising:

reacting, in a first stage, at least one (poly)amine (1) of the general formula $$H-\underset{\underset{R_x^3}{|}}{N}(-R^4-\underset{\underset{R_x^3}{|}}{N})_n-H \quad (IV)$$

where $R^3$ is a hydrogen atom or a monovalent hydrocarbon radical having 1 to 60 carbon atoms per radical which may be interrupted by or substituted by one or more separate hetero atoms selected from the group consisting of nitrogen, oxygen, sulfur and halogen, $R^4$ is a divalent hydrocarbon radical having 1 to 10 carbon atoms per radical, n is 0 or an integer from 1 to 10, each x is the same or different and represents 0 or 1, with at least one epoxy-containing organosilicon compound (2) containing units of the general formula $$E_cR_a(R^1O)_bSiO_{\frac{4-(a+b+c)}{2}} \quad (V)$$

where each R is the same or different and represents a monovalent optionally halogenated hydrocarbon radical having 1 to 18 carbon atoms, each $R^1$ is the same or different and represents a monovalent hydrocarbon radical having 1 to 8 carbon atoms per radical, a is 0, 1, 2 or 3, b is 0, 1, 2 or 3, each E is the same or different and represents a monovalent SiC-attached organic radical which contains an epoxy group, and c is 0 or 1, with the proviso that the sum of a+b +c is $\leq 3$ and that at least one E radical is present per molecule, and with the proviso that the employed ratio of N-attached hydrogen in (poly)amine(s) (1) to epoxy groups in organosilicon compound(s) (2) is such that toluene-soluble amino-containing organosilicon compounds are obtained, and partially or fully protonating, in a second stage, the amino-containing organosilicon compounds obtained in the first stage by adding an acid (4) to obtain ammonio-containing organosilicon compounds soluble in isopropanol or diethylene glycol monobutyl ether.

5. A process for preparing the ammonio-containing organosilicon compounds of claim 1, comprising:

reacting, in a first stage, at least one (poly)amine (1) of the general formula

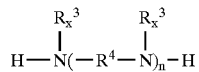

(IV)

where $R^3$, $R^4$, n and x are each as defined in claim 1, with at least one epoxy-containing organosilicon compounds (2) containing units of the general formula

(V)

where R, $R^1$, a and b are each as defined in claim 1, each E is the same or different and represents a monovalent SiC-attached organic radical which contains an epoxy group, and c is 0 or 1, with the proviso that the sum of a+b+c is $\leq 3$ and that at least one E radical is present per molecule, and with the proviso that the employed ratio of N-attached hydrogen in (poly)amine(s) (1) to epoxy groups in organosilicon compound(s) (2) is such that toluene-soluble amino-containing organosilicon compounds are obtained, and, in a second stage, partially or fully protonating the amino-containing organosilicon compounds obtained in the first stage by addition of acid (4) to obtain ammonio-containing organosilicon compounds soluble in isopropanol or diethylene glycol monobutyl ether.

6. The process of claim 5, wherein E is a radical of the formula

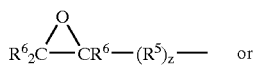

(VI)

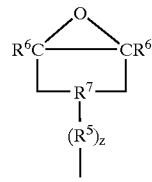

(VII)

where $R^5$ is a divalent hydrocarbon radical having 1 to 10 carbon atoms per radical which may be substituted by an ether oxygen atom, $R^6$ is a hydrogen atom or a monovalent hydrocarbon radical having 1 to 10 carbon atoms per radical which may be substituted by an ether oxygen atom, $R^7$ is a trivalent hydrocarbon radical having 3 to 12 carbon atoms per radical and z is 0 or 1.

7. The process of claim 5, wherein $R^4$ is a radical of the formula —$(CH_2)_3$—.

8. A process for impregnating organic fibers, comprising contacting said organic fibers with at least one organosilicon compound of claim 1.

9. A process for impregnating organic fibers, comprising contacting said organic fibers with at least one organosilicon compound of claim 4.

10. A process for impregnating organic fibers, comprising contacting said organic fibers with at least one organosilicon compound prepared by the process of claim 5.

11. A process for impregnating a siliceous surface comprising contacting said surface with at least one organosilicon compound of claim 1.

12. A process for impregnating a siliceous surface comprising contacting said surface with at least one organosilicon compound of claim 4.

13. A process for impregnating a siliceous surface comprising contacting said surface with at least one organosilicon compound prepared by the process of claim 5.

* * * * *